United States Patent [19]

Jorzyk et al.

[11] Patent Number: 4,468,923
[45] Date of Patent: Sep. 4, 1984

[54] PROCESS AND PLANT FOR GENERATING ELECTRICAL ENERGY

[75] Inventors: Sigurd Jorzyk, Saarbrücken; Willy Meyer, Dudweiler; Heinz Splicthoff, Friedrichstahal, all of Fed. Rep. of Germany

[73] Assignee: Saarbergwerke AG, Saarbrücken, Fed. Rep. of Germany

[21] Appl. No.: 352,300

[22] Filed: Feb. 25, 1982

Related U.S. Application Data

[63] Continuation of Ser. No. 947,187, Sep. 29, 1978, abandoned.

[30] Foreign Application Priority Data

Sep. 29, 1977 [DE] Fed. Rep. of Germany ....... 2743830

[51] Int. Cl.$^3$ .............................................. F02C 3/26
[52] U.S. Cl. ................................ 60/39.02; 60/39.182; 60/39.464
[58] Field of Search .............. 60/39.02, 39.12, 39.181, 60/39.182, 39.464; 122/4 D; 431/7, 170

[56] References Cited

U.S. PATENT DOCUMENTS

| | | | |
|---|---|---|---|
| 3,101,697 | 8/1963 | Hunter | 110/342 |
| 3,127,744 | 4/1964 | Nettel | 60/655 |
| 3,234,735 | 2/1966 | Pirsh et al. | 60/39.181 |
| 3,446,012 | 5/1969 | Foster-Pegg | 60/39.02 |
| 3,716,003 | 2/1973 | Battcock | 122/4 D |
| 4,086,758 | 5/1978 | Harboe | 60/39.464 |
| 4,116,005 | 9/1978 | Willyoung | 60/39.181 |

*Primary Examiner*—Louis J. Casaregola
*Attorney, Agent, or Firm*—James Creighton Wray

[57] ABSTRACT

A part of a solid fuel is combusted in a fluidized bed combustor; a remainder of the fuel is combusted in a dust combustor. Waste gases from the fluidized bed are fed to the dust combustor. A heat exchanger in the fluidized bed heats compressed air in which fuel is combusted to drive a hot gas turbine. A heat exchange in the dust combustor heats water to superheated steam to drive a steam turbine.

20 Claims, 2 Drawing Figures

PROCESS AND PLANT FOR GENERATING ELECTRICAL ENERGY

This application is a continuation of application Ser. No. 947,187 filed 9-29-78 abandoned.

The invention relates to a process for generating electrical energy by combustion of solid fuels, transfer of the combution heat to operating media and "energy-yielding" expansion of operating media, as well as to a plant for carrying out the process.

In conventional steam power plants on a coal basis, the combustion of coal is carried out in a so-called cyclone furnace coal dust combustor at high temperatures between about 1000°–350° C. However, these high temperatures result in a high degree of impurities, e.g. sulfur dioxide and especially nitrogen oxide, which for reasons of environmental concerns cannot be released into the atmosphere. Removal of these pollutants from the flue gases necessitates costly purification systems which increase capital investment and operating costs of the plant significantly. Moreover, operation of such power plants requires a relatively expensive coal preparation process, and utilization of different kinds of coal is limited.

It is the purpose of the invention to develop a process for the generation of electrical energy by combustion of solid fuels which make it possible to reduce pollutants, increase efficiency, reduce coal preparation costs and facilitate utilization of an entire range of coal fuels.

The present invention accomplishes this in that a part of the fuel is incinerated in a fluidized bed combustor, and the residual in a fuel dust combustor which may be a cyclone furnace, in that the waste gases of the fluidized bed combustor are directed to the cyclone furnace, that a part of the heat produced in the fluidized bed combustor is transferred to the compressed energy media of a gas turbine, and that the residual heat, together with the combustion heat of the cyclone furnace, is utilized for generation of high pressure superheated steam.

The intermeshing, according to the invention, of a fluidized bed combustor with a cyclone furnace, in the vessel of a power plant, and the transfer of the resulting heat in the individual combustion zones to different working media, i.e. air and water, results in a number of advantages:

According to the invention, it is also possible to utilize hear derived from coal in a gas turbine, which has an especially high degree of efficiency, which in turn increases the total efficiency of the power plant as compared to conventional power plants.

In contrast to strict fluidized bed combustors, which are already known from the chemical process industry, coal gasification (Winkler process), and waste incineration with their inherent technical problems of flue gas treatment, especially dust removal from the hot waste gases, there is the added advantage that a substantial proportion of the unburned coal particles entrained in the fluidized bed combustor waste gases are incinerated in the cyclone furnace.

Also the carbon monoxide forming in the fluidized bed combustor is incinerated into harmless carbon dioxide.

Moreover, the hot waste gases of the fluidized bed furnace are cooled in the cold dust zone by heat exchange with the steam generator to such a degree that separation of the remaining solid particles no longer presents problems. Separation can be effected in the same operation with the removal of dust from the waste gases of the coal dust combustion by precipitators (electro filters?) which have been widely used and proven highly effective in power plant technology.

Formation of pollutants, especially nitrogen oxide formation, as a result of coal combustion, is substantially reduced by the instant process. The reasons therefor are that there is initially low nitrogen oxide formation because of relatively low combustion temperatures prevailing in the fluidized bed combustor. Furthermore, the feeding of hot flue gases of the fluidized bed combustor into the cyclone furnace supports and stabilizes the firing characteristics of the combustion, so that even in the region of the coal dust combustion, it can be driven at lower temperatures which in turn, considerably decreases nitrogen formation in the coal dust combustion. In the driving of the cyclone furnace at low load, no supporting firing by foreign fuels like oil or fuel gas, is necessary. On account of the effective exchange of matter in the fluidized bed a presulfurization can be carried out in the fluidized bed combustor, when the reaction ingredients of the combustion, fed into the fluidized bed, are supplemented by sulfur-binding materials, e.g. lime CaO.

A power plant operating on the principles of the instant method has the advantage of great flexibility concerning above-mentioned load fluctuations. Thus, the fluidized bed combustor and the gas turbine cycle linked thereto facilitate, for example, the generation of a constant base load of 20–50% of the power plant's total output capacity, while the cyclone furnace can be utilized partially or entirely, depending on existing load requirements.

A further advantage of the instant process is that the application of the fluidized bed combustion permits the use of a practically unlimited range of coal fuels, thus affording widest utilization of the energy raw material, coal, occuring in so many kinds and qualities.

Still another feature of the invention is that the fluidized bed combustor consists of several fluidized beds which are independent of each other, and which are in parallel with each other for the purpose of fuel and air supply. The advantage of this procedure is that it permits complete decoupling of the individual fluidized bed by connecting and disconnecting individual fluidized beds thus facilitating a gradual performance variation of the fluidized bed combustor in a simple manner. Also, malfunctioning of a fluidized bed on account of some disturbance, does not result in failure of the entire fluidized bed combustor. A variation in fluidized bed performance in the region of the hot air gas turbine can be compensated for by a change in fuel feed to the combustion chamber of the hot air turbine.

The close connecting relationship to the cyclone combustion permits that changes in the heat coupling between fluidized bed combustor and cyclone furnace, caused, for instance, by changes in the fluidized bed waste gas quantity, variations in gas turbine waste gas particle streams or their oxygen content, to the cyclone or fluidized bed combustion, do not adversely affect the entire system as they can be compensated for by the cyclone furnace.

A plant for carrying out the instant process is characterized in having an integrated combustion chamber with two combustion zones, communicating with each other, the lower one being a fluidized bed combustor, and the upper one being a cyclone furnace, further, by at least one heat exchanger immersed into the fluidized bed, whose intake is in communication with an air compressor and whose outlet communicates with a hot air turbine, as well as by having a heat exchanger arranged in the cyclone furance whose inlet is in communication with a feed water high pressure pump and whose outlet communicates with a steam turbine.

The invention is further demonstrated by way of examples schematically depicted in the drawing.

Figure 2:
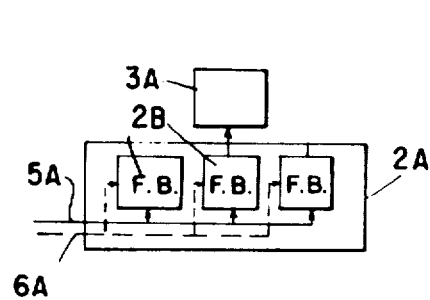
FIG. 2 shows another feature of the invention in which several fluidized beds are parallel with each other for the purposes of fuel and air supply.
Figure 1:
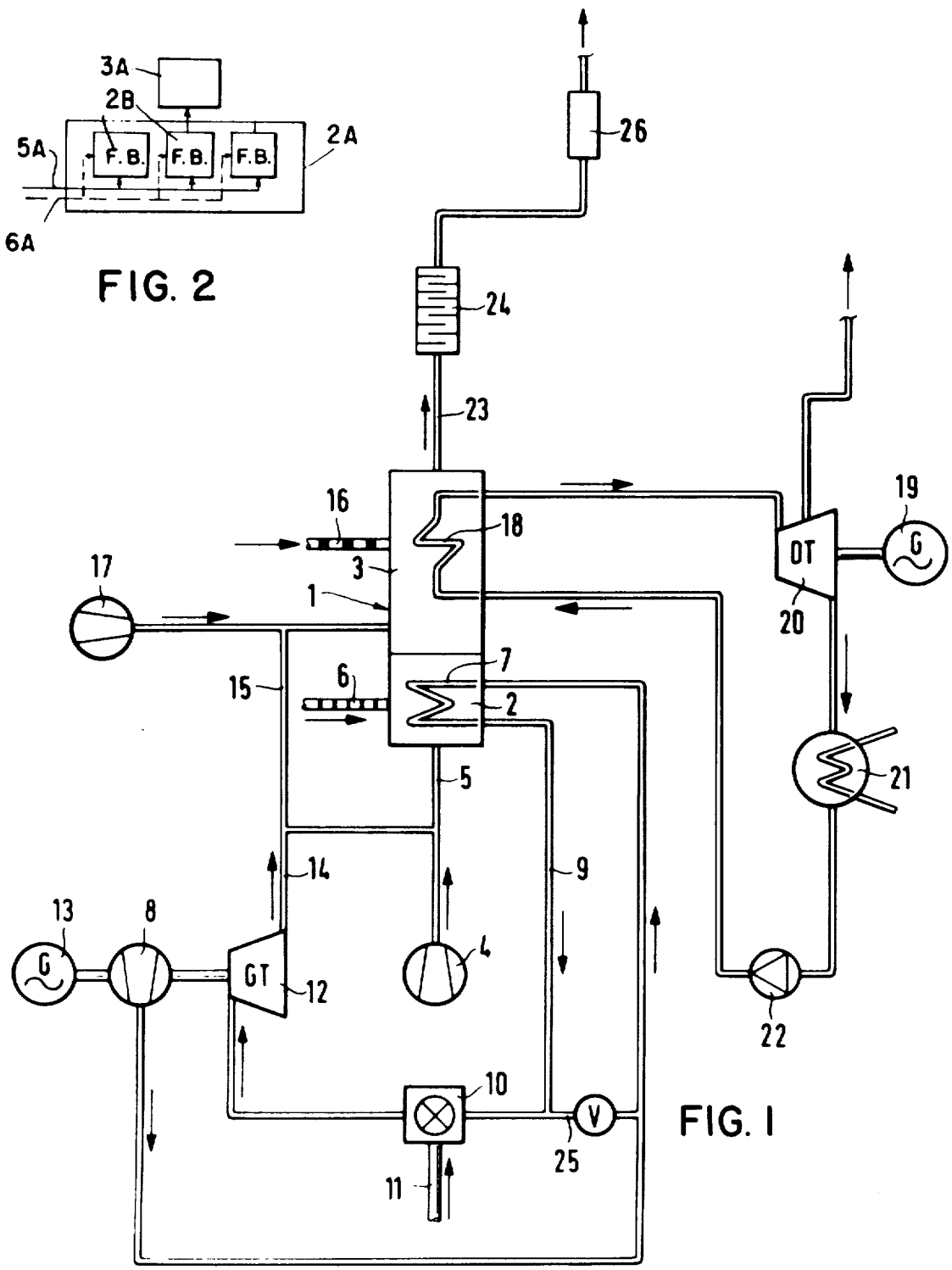
FIG. 1 is a schematic representation of a preferred system according to the present invention.

The drawing shows a combination gas-steam turbine power plant with an integrated combustion chamber 1, in which the coal charge is fired. According to the invention, the combustion is carried out in two separate zones, i.e. in a fluidized bed combustor in lower region 2 of combustion 1, and in a coal dust furnace, located in upper region 3. Oxygen-containing gas for maintaining the fluidized bed combustion, is supplied via line 5, while the coal required is transported to the fluidized bed combustor via passage 6. Line 5, connected via line 14 to the outlet of hot air gas turbine 12 under normal operation conditions can, however, if necessary, be supplied with fresh air by means of blower 4.

A partial heat stream produced in the fluidized bed at a temperature level of approximately 800°-850° C. is transferred to the operating air of a turbine by way of heat exchanger 7, directly immersted into the fluidized bed. Individually, operational air is drawn in by way of compressor 8 and is compressed to a pressure of approximately 6-12 bar, then heated to about 500°-750° C. in heat exchanger 7 and next transferred to combustion chamber 10 via line 9. Within the combustion chamber 10, there is further heating of the air by the combustion of fuels, e.g. natural gas, in other words, essentially methane, coke oven gas or coal gasification gas, which is supplied to the combustion chamber 10 via line 11. The gas mixture consisting of air and fuel waste gas produced in combustion chamber 10 at a temperature of between about 800°-850° C., is now fed to gas turbine 12 and expanded resulting in an energy yield. Part of the recovered energy is directly used for the operation of compressor 8, while the reaminder is converted into electrical energy in generator 13.

The waste gas of gas turbine 12, which still has a temperature of about 350° to 450° C. and whose oxygen content is still between 18 and 21%, again is fed to fluidized bed combustor 2, in the form of oxygen rich gas, via line 14. This waste gas may partially, however, also be directed to coal dust furnace 3 via line 15. The temperature and amount of air in the fluidized bed combustor can be regulated by means of bypass line 25, which is equipped with a regulating element between the exit of compressor 8 and the entrance of combustion chamber 10. The inventive concept of the gas turbine cycle, in connection with the fluidized bed combustion, the additional heating of the operational air by direct combustion of fuel gases in the cycle, as well as the return of the waste gases of the hot air gas turbine to the combustion chamber, result in a number of advantages.

The high heat transfer to heat exchanger lines immersed in the fluidized bed, facilitates a maximum transfer of heat from the fluidized bed to the operational air of the hot air turbine. Also by further heating of the operation air in the combustion chamber, and by increasing the mass flow by adding fuel gases, the performance of the gas turbine is further increased. It is also possible to return the waste heat of the gas turbine directly to the system, i.e. no additional heat exchanger and heat transfer cycles, which always lead to heat losses, are necessary. The waste heat regeneration between hot air gas turbine and fluidized bed, therefore, leads to an improvement in the overall efficiency of the power plant, and inherently, to a diminished fuel consumption.

The introduction of $O_2$ containing waste gases from the hot air gas turbine into the combustion chamber guarantee a full oxygen utilization of the air supplied by compressor 8. The same applies to instances of varying $O_2$ consumption in combustion chamber 10 and in fluidized bed combustor 2.

The waste gases, containing a considerable amount of entrained solids particles, occurring in fluidized bed combustor 2, which normally adversely affect the operation, are fed directly to pulverized fuel (coal dust) combustor 3 and are further treated there, together with the reaction ingredients of the coal dust furnace, i.e. finely divided coal, which is introduced via passage 16, and oxygen-containing gas which is introduced via lines 14 and 15, but could enter vial blower 17 and line 15, if necessary. The heat generated in the coal dust combustor, as well as part of the heat contents of the waste gas of the fluidized bed furnace, for the purpose of generating high pressure superheated steam, are transferred to a heat exchanger 18, which is located in the coal dust combustor.

The steam is then expanded in a steam turbine which is coupled with generator 19, and is then condensed in condeser 21 and returned to steam generator 18 via high pressure pump 22.

The waste gases of coal dust combustion, inclusive of waste gases of the fluidized bed combustor, are drawn off the combustion chamber 1 via lines 23, at a temperature of approximately 160°-180° C. and are then thoroughly dust-cleaned in a precipitator 24 (electro-filter?) and finally purified by removing pollutants, especially sulfur and nitrogen oxides, in a purification plant 26.

As shown in FIG. 2, the fluidized bed combuster 2a comprises several fluidized beds 2b, which are parallel with each other for the purposes of fuel supply 6a and air supply 5a.

The innovative combination of a fluidized bed combustor with a coal dust combustor makes it possible to substantially reduce the formation of harmful matter, especially the formation of nitrogen oxides when incinerating the feed coal. The nitrogen formation in the combustion zone is initially low because of the relatively low combustion temperatures in the fluidized bed. Moreover, the introduction of the hot waste gases of the fluidized bed combustor into the cyclone combustion zone results in promoting ignition and support for safe coal dust combustion, and thereby permits lower combustion temperatures for the cyclone combustion, and inherently, a combustion of coal which satisfies the requirements of environmental protection.

We claim:

1. Process for generating energy by fuel combustion, transfer of the combustion heat to operating medium and energy-yielding expansion of the operating medium, characterized in that a first portion of fuel is fed to and is combusted in a fluidized bed combuster and a second portion of fuel is fed directly to a second combuster, and the second portion of fuel is combusted in the second combuster, that hot waste gases of the fluidized bed combuster having unburned fuel particles entrained therein are supplied directly to the second combuster to support and stabilize combustion therein at reduced temperatures, a substantial portion of said unburned particles from the fluidized bed combuster being burned in the second combuster along with said second portion of fuel which is fed directly to the second combuster, that part of the heat obtained in the fluidized bed combuster is transferred to compressed operating medium for a gas turbine and that residual heat from waste gas of the fluidized bed combuster, together with the combustion heat of the second combuster, is used for generating high pressure super-heated steam.

2. The process according to claim 1 characterized in that the operating medium of the gas turbine, heated in the fluidized bed combuster, before its energy yielding expansion, is further heated by combustion of an additional fuel in the operating medium.

3. The process according to claim 1 characterized in that at least part of waste gases of the gas turbine are directly supplied to the fluidized bed combuster, and the residual is directly supplied to the second combuster.

4. The process according to claim 1 characterized in that sulfur-combining matter is supplied to the fluidized bed combuster.

5. The process according to claim 1 characterized in that the fluidized bed combuster consists of several fluidized beds which are independent of each other.

6. The process of claim 5 wherein the several fluidized beds are in parallel with each other.

7. The process of claim 1 wherein the second combuster comprises a cyclone furnace.

8. The process of claim 1 wherein said hot waste gases include carbon monoxide which is burned into carbon dioxide in the second combuster.

9. The process of claim 1 wherein said using of residual heat together with combustion heat comprises cooling said hot waste gases by heat exchange in the second combuster.

10. The process of claim 1 wherein said second combuster is a pulverized fuel combuster.

11. The process according to claim 10 wherein combustion of the second portion of fuel in the pulverized combuster occurs at lower than normal temperature due to the feeding of hot waste gases from the fluidized bed combuster, thus decreasing NOX formation in the coal dust combustion.

12. The process of claim 11 wherein the fluidized bed combuster and the pulverized fuel combuster provide a constant baseload of from about 20-50% of a power plant's total output capacity and further characterized in that the pulverized fuel furnace is utilized partially or entirely depending on existing load requirements.

13. The process of claim 10 wherein the fluidized bed is fed a wide range of fuels of many kinds and qualities.

14. The process of claim 10 further comprising compensating by combustion in the pulverized fuel combuster for variations in hot waste gases of the fluidized bed and unburned fuel particles entrained therein.

15. The process of claim 10 further comprising immersing at least one heat exchanger in a fluidized bed, heating air in that heat exchanger, compressing heated air from that heat exchanger, adding and burning fuel in the compressed air and driving a hot-air turbine and exhausting air from the hot-air turbine into the fluidized bed combuster and separately and directly into the pulverized fuel combuster.

16. The process of claim 15 further comprising inserting a second heat exchanger into the pulverized fuel combuster for generating the high-pressure superheated steam, driving a steam turbine with the combuster, condensing steam from the steam turbine into water, pumping the water to a high pressure and returning the water under a high pressure to the second heat exchanger.

17. The process of claim 16 further comprising heating air to about 500° to 750° C. in the first heat exchanger, heating the air from the heat exchanger to about 800° to 850° C. before feeding the air to the gas turbine and then feeding the air from the gas turbine at a temperature of about 350° to 450° C. and having an oxygen content of about 18 to 21% to the fluidized bed and separately to the pulverized fuel combuster.

18. The process of claim 10 wherein fuel is combusted in the pulverized fuel combuster at temperatures below 1000° C.

19. Apparatus for combusting fuel comprising fluidized bed combuster means for combusting fuel particles, first fuel feed means connected to the fluidized bed combuster means for feeding first fuel particles to the fluidized bed combuster means, air supply means connected to the fluidized bed combuster means for supplying air to the fluidized bed combuster means, second, pulverized fuel combuster means positioned adjacent the fluidized bed combuster means, second, pulverized fuel feed means connected to the pulverized fuel combuster means for supplying pulverized fuel to the pulverized fuel combuster means, second air supply means connected to the pulverized fuel combuster means for supplying air to the pulverized fuel combuster means, waste gas supply means connected to the fluidized bed combuster means and to the pulverized fuel combuster means for supplying waste gases having unburned fuel particles entrained therein from the fluidized bed combuster means to the pulverized fuel combuster means, first energy conversion means connected to the fluidized bed combuster means for converting heat energy from the fluidized bed combuster means to useful energy, and second energy conversion means conected to the pulverized fuel combuster means for converting heat from the pulverized fuel combuster means to usable energy.

20. Plant apparatus for generating electrical energy comprising fluidized bed combuster means for burning particulate fuel in a fluidized bed and generating heat and waste gases containing entrained particulate fuel, first, particulate fuel supply means connected to the fluidized bed combuster means for supplying particulare fuel to the fluidized bed combuster means, air supply means connected to the fluidized bed combuster means for supplying air to the fluidized bed combuster means and first blower means connected to the air supply means for pressurizing air in the air supply means, first heat exchange means in the fluidized bed combuster means, second blower means for supplying pressurized air at from about 6 to 12 Bar to the first heat exchange means, combustion chamber means and means for connecting the combustion chamber means to the first heat exchange means for supplying heated air at from about 500° to 750° C. to the combustion chamber means, second, gaseous fuel supply means connected to the combustion chamber means for supplying gaseous fuel to the combustion chamber means to burn the fuel in the presence of the compressed air, heating the compressed air to about 800° to 850° C., hot air turbine means and means connecting the hot air turbine means to the combustion chamber means for driving the hot air turbine means with the heated compressed air, turbine output means connected to the second blower means for driving the second blower means and connected to a first generating means for generating electricity from the turbine output, means connecting the hot-air turbine with the air supply for supplying exhaust hot air from the hot-air turbine to the air supply, second, pulverized fuel combuster means positioned adjacent the first, fluidized bed combuster means and means connecting the first fluidized bed combuster means and second pulverized fuel combuster means for flowing waste gas and entrained particulate fuel from the fluidized bed combuster means to the pulverized fuel combuster means, third, pulverized fuel supply means connected to the pulverized fuel combuster means for supplying pulverized fuel to the pulverized fuel combuster means, third air supply means connected to the pulverized fuel combuster means for supplying air to the pulverized fuel combuster means, third blower means connected to the third air supply means for pressurizing air in the third air supply means, means connecting the hot air turbine means to the third air supply means for supplying exhaust hot air from the hot-air turbine means to the third air supply means and to the pulverized fuel combuster means, second heat exchange means connected to the fluidized bed combuster means for removing heat of combustion in the pulverized fuel combuster means, steam turbine means and means connected to the second heat exchanger and to the steam turbine means for conducting steam from the second heat exchanger to the steam turbine, second generator means connected to the steam turbine for operating the generator means by the steam turbine and for generating electricity thereby, condenser means connected to the steam turbine means for condensing steam from the steam turbine means to water, pump means for placing water under pressure, means connected to the condenser means and to the pump means for supplying water to the pump means and means connected to the pump means and to the second heat exchanger for supplying pressurized water to the second heat exchanger, waste gas conduit means connected to the pulverized fuel combuster means for withdrawing waste gas from the pulverized fuel combuster means, precipitator means connected to the waste gas conduit means for precipitating particles from the waste gas conduit means, purification means connected to the waste gas conduit means for purifying gas in the waste gas conduit means.

* * * * *